Nov. 24, 1970   M. E. GRINWALD   3,541,769
DIVERTER AND CUTTER ATTACHMENT FOR AQUATIC HARVESTER
Filed Jan. 8, 1969
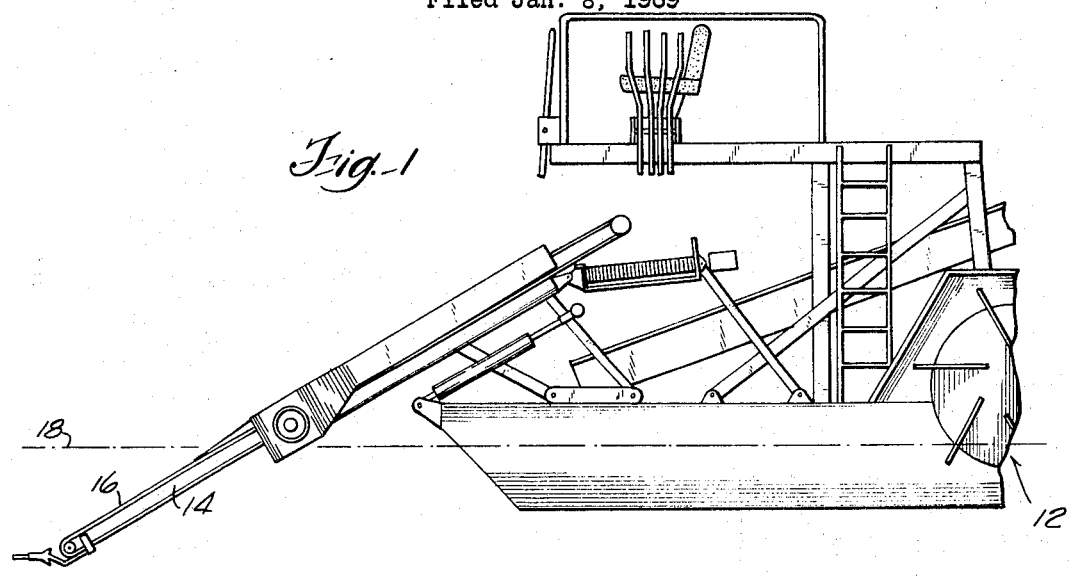
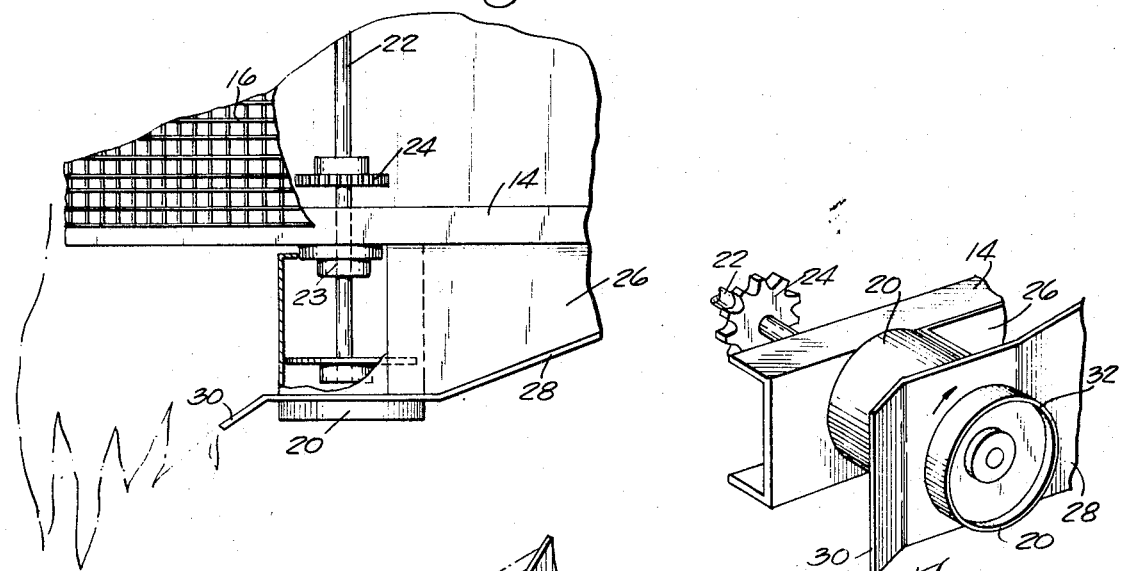
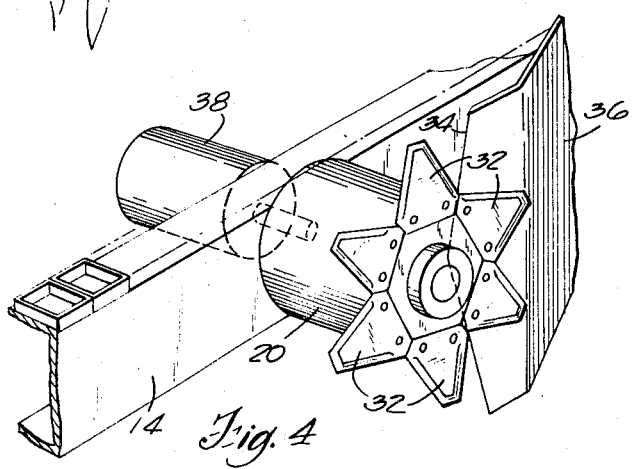
Inventor
Mathias E. Grinwald
By
Gerrit D. Sorter
Attorney United States Patent Office 3,541,769
Patented Nov. 24, 1970

3,541,769
DIVERTER AND CUTTER ATTACHMENT FOR AQUATIC HARVESTER
Mathias E. Grinwald, N46 W31067 Highway 16, Hartland, Wis. 53029
Filed Jan. 8, 1969, Ser. No. 789,693
Int. Cl. A01d 45/08
U.S. Cl. 56—9                     6 Claims

ABSTRACT OF THE DISCLOSURE

A weed diverter attachment for an aquatic harvester which is located at the side of the conveyor carrying weeds, marine growth and underwater growth from the underwater cutter assembly to an above water storage, comprising a cylinder driven so that its upper surface travels in the same direction as the conveyor. A scraper plate and a turning shield are associated with the cylinder to aid it in guiding weeds and the like dangling or hanging from the side of the conveyor on to the conveyor.

An alternative attachment consists of a cutting member mounted on such conveyor which cooperates with a fixed cutting edge to cut off such dangling weeds.

BACKGROUND OF THE INVENTION

Field of invention

This invention relates to means for diverting weeds and the like dangling or hanging from the conveyor of an aquatic harvester on to such conveyor and alternatively to cut off such weeds. One purpose is to make the harvesting more efficient. Another purpose is to prevent the dangling or hanging weeds from bunching up at the top of the conveyor and clogging the conveyor drive mechanism and to inhibit the accumulation of hanging weeds at the sides of the conveyor as the weeds are lifted from the water.

Description of the prior art

In U.S. Pat. No. 3,347,029 there is shown an aquatic harvester of the type to which the diverter of this invention may be attached. A preliminary patentability search uncovered U.S. Pat. No. 1,410,334, a grain feeder for thrashers and U.S. Pat. No. 2,249,394, a potato digger. The first patent pertains to movable side walls to orient bundles of grain on the carrier. The second patent has vine gathering rolls at the sides of the conveyor which rotate inwardly at their tops about axis parallel to the path of travel of the conveyor.

The efficacy of these devices as applied to aquatic harvesters is not apparent.

SUMMARY OF THE INVENTION

A pair of cylinders are mounted adjacent opposite sides of the main conveyor of an aquatic harvester and rotate about an axis perpendicular to the path of travel of the conveyor. In cases of long (tall) weeds or where there are free floating weeds or growth, the conveyor will be loaded to an extent that weeds will dangle or hang over the sides of the conveyor as they are lifted from the water. These hanging weeds ride up on the cylinders and are guided onto the conveyor by a scraper plate and turning shield.

Where the free floating weeds are dense it is more efficient to cut off the hanging parts. This is done by a cutting member or by placing cutting blades on the outer ends of the cylinders which engage a fixed cutting edge. The hanging weeds will be cut and fall away from the conveyor. This limits the mass of weeds being carried up by the conveyor to an amount which will not clog the device.

BRIEF DESCRIPTION OF THE DRAWINGS

FIG. 1 is a fragmentary view in side elevation of an aquatic harvester having a main conveyor to which is attached a weed diverter embodying the present invention;

FIG. 2 is a fragmentary top plan view of a weed diverter embodying the present invention, parts being broken away and shown in section for clarity of illustration;

FIG. 3 is a fragmentary perspective view of one such weed diverter with the belt of the conveyor removed to show one type of drive mechanism; and FIG. 4 is a fragmentary perspective view of a weed diverter embodying a modification of the present invention.

DESCRIPTION OF THE PREFERRED EMBODIMENT

Referring to the drawings by reference numerals, the weed diverter is shown mounted on the main conveyor 10 of an aquatic harvester 12 of the type described in U.S. Pat. No. 3,347,029. It is to be understood that there are a pair of diverters, one mounted on each side of the main conveyor. Only the one on the near side of the conveyor as viewed in FIG. 1 is illustrated and described in detail.

The conveyor 10 includes a main frame 14 which supports a wire type conveyor belt 16. As illustrated, the main conveyor is in its fully extended position. The weed diverters are so mounted with respect to the cutter assembly that in the extended position of the conveyor the weed diverters will be above the water level indicated at 18.

The weed diverters consist of cylinders 20 carried by a transverse shaft 22 mounted in bearings 23 on the frame 14. The inner end of the cylinders are close to the edge of the conveyor belt and the frame 14 on which it slides. Sprockets 24 (only one shown) mounted on the shaft 22 are engaged by the conveyor belt 16 (preferably the lower run thereof) and as the belt is moved the cylinders will rotate so that their upper surfaces move in the direction of the travel of the conveyor belt. This is indicated in FIG. 3 by the arrow where the direction of rotation is clockwise.

Scraper plates 26 extend outwardly from the frame 16 and its forward edge is in close proximity to the upper surface of the cylinders 20 to provide floors which are substantially level with the surface of the conveyor belt. Turning shields 28 have outwardly bent forward lips 30 and holes through which the end of the cylinders 20 project. The rear part of the turning shields 28 angles inwardly toward the frame 14 and extends along such frame to also provide a guide for the weeds in the conventional manner as shown in the aforementioned patent.

As standing weeds are cut and carried up by the conveyor belt 16 the longer weeds will hang over the edge of the conveyor and if they are permitted to so stay will become entangled in the conveyor drive mechanism or bunch up at the top of the conveyor and cause a stoppage. However, with the cylinders 20 rotating in the direction described, the weeds that dangle over the edge of the conveyor upon reaching the cylinders will be carried by them upwardly onto the scraper plates 26 and thence forced inwardly by the turning shield 28 onto the conveyor belt whence they will be readily retained by the guiding walls.

In instances where the weeds are dense and are free floating those engaged by the conveyor belt will pull in from beyond its sides such an extraordinary excess of weeds that the entire system will be clogged. To prevent this from occurring the alternate or modification of this invention contemplates a cutting member which engages with a fixed blade to sever the dangling weeds. One way of accomplishing this is to add to the outer end of the cylinders 20 a number of cutting blades 32 which are slidably engaged with a fixed cutting edge 34 formed on the forward edge of modified turning shields 36 (see FIG. 4). As the cylinders rotate the excess amount of weeds hanging from the conveyor belt will be cut off or severed and drop back into the water. The amount of the weeds which then moves up the conveyor is limited and will be easily handled.

In place of adapting the cylinders of existing diverters to perform the cut off, this invention also includes the replacing of the cylinders 20 with cutting members mounted on the shaft 22 adjacent the frame 14. These cutting members will rotate in sliding engagement with fixed cutting edges mounted on the frame 14 to sever and let drop the excess of weeds being drawn into the conveyor because of an intermingling with those on the conveyor. Such cutting members are for example coarse teeth circular saws of standard design.

While the preferred drive for the cylinders of the diverter is the sprocket arrangement driven from the conveyor belt, it is within the teaching of this invention to provide an individual motor drive for the cylinders as shown schematcally at 38 in FIG. 4. This motor may be a conventional hydraulically driven motor or waterproofed electric motor. The principal advantages of this modification are the elimination of wear on the conveyor belt as engaged by the sprocket 24 and a control of the speed of the cylinder so it can be varied with respect to the conveyor belt speed of travel.

What is claimed is:

1. The combination of an aquatic harvester having a conveyor adapted to extend from below to above water level and weed diverting means for inhibiting the accumulation of hanging weeds at the sides of the conveyor as the weeds are lifted from the water comprising:
   a frame for the conveyor;
   a conveyor belt having an upper run movable relative to said frame and having an upwardly inclined path of travel;
   said weed diverting means comprising a cylinder rotatably carried by said frame adjacent a side of said belt for positioning above water level, said cylinder having an axis of rotation perpendicular to said path of travel; and
   means for rotating said cylinder so that its upper surface travels in the same direction as said upper run to thereby move said dangling weeds over said rotating surface and onto said upper run.

2. A weed diverting means as set forth in claim 1 wherein:
   a scraper plate is carried by said frame with an end close to the upper surface of said cylinder to provide a floor for weeds fed thereto by said cylinder.

3. A weed diverting means as set forth in claim 2 wherein:
   a turning shield is carried by said frame in close association with said scraper plate and angles inwardly from near the outer end of said cylinder to said frame to direct weeds fed by said cylinder to said scraper plate onto said conveyor belt.

4. A weed diverting means as set forth in claim 3 wherein:
   said turning shield has an opening therein through which the outer end of said cylinder projects.

5. A weed diverting means as set forth in claim 4 wherein:
   said turning shield has an out-turned lip on its outer end.

6. A weed diverting means as set forth in claim 3 wherein:
   cutting blades are carried by the outer end of said cylinder; and
   a fixed blade is provided by the outer end of said turning shield with which said blades have sliding engagement.

References Cited

UNITED STATES PATENTS

| | | | |
|---|---|---|---|
| 555,401 | 2/1896 | Radermacher | 198—9 |
| 930,846 | 8/1909 | Dean. | |
| 1,715,218 | 5/1929 | Wright et al. | 198—9 |
| 1,795,003 | 3/1931 | Allen | 56—9 |
| 2,195,471 | 4/1940 | Sishc | 198—9 |
| 2,757,462 | 8/1956 | Kolbe | 198—9 XR |
| 3,311,238 | 3/1967 | Huff | 56—9 XR |
| 3,347,029 | 10/1967 | Grinwald | 56—9 |
| 3,449,892 | 6/1969 | Huff | 56—9 |
| 3,468,106 | 9/1969 | Myers et al. | 56—9 |
| 3,477,213 | 11/1969 | Just et al. | 56—9 |

F. BARRY SHAY, Primary Examiner

J. A. OLIFF, Assistant Examiner

U.S. Cl. X.R.

56—256; 198—9